(12) United States Patent
Boles et al.

(10) Patent No.: US 6,985,986 B2
(45) Date of Patent: Jan. 10, 2006

(54) VARIABLE CYCLE INTERRUPT DISABLING

(75) Inventors: Brian Boles, Mesa, AZ (US); Joseph W. Triece, Phoenix, AZ (US); Joshua M. Conner, Apache Junction, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 497 days.

(21) Appl. No.: 09/870,447

(22) Filed: Jun. 1, 2001

(65) Prior Publication Data

US 2002/0188784 A1 Dec. 12, 2002

(51) Int. Cl.
*G06F 13/24* (2006.01)
*G06F 9/44* (2006.01)

(52) U.S. Cl. .................. 710/262; 710/260; 712/244
(58) Field of Classification Search ............. 710/260, 710/262, 266; 714/34; 712/244
See application file for complete search history.

(56) References Cited

U.S. PATENT DOCUMENTS

| | | | |
|---|---|---|---|
| 3,771,146 A | 11/1973 | Cotton et al. ............... 710/260 |
| 3,781,810 A | 12/1973 | Downing ................. 340/172.5 |
| 3,886,524 A | 5/1975 | Appek ........................ 710/110 |
| 3,930,253 A | 12/1975 | Maida ....................... 340/347 |
| 4,025,771 A | 5/1977 | Lynch et al. ................ 708/521 |
| 4,074,353 A | 2/1978 | Woods et al. ............... 710/264 |
| 4,090,250 A | 5/1978 | Carlson et al. ............. 712/234 |
| 4,323,981 A | 4/1982 | Nakamura .................. 364/749 |
| 4,379,338 A | 4/1983 | Nishitani et al. ........... 708/552 |
| 4,398,244 A | 8/1983 | Chu et al. ................... 364/200 |
| 4,408,274 A | 10/1983 | Wheatley et al. ........... 364/200 |
| 4,451,885 A | 5/1984 | Gerson et al. .............. 708/200 |
| 4,472,788 A | 9/1984 | Yamazaki ................... 364/900 |
| 4,481,576 A | 11/1984 | Bicknell ..................... 364/200 |
| 4,488,252 A | 12/1984 | Vassar ........................ 364/748 |
| 4,511,990 A | 4/1985 | Hagiwara et al. ........... 364/748 |
| 4,556,938 A | 12/1985 | Parker et al. ............... 364/200 |

(Continued)

FOREIGN PATENT DOCUMENTS

| | | |
|---|---|---|
| EP | 0 554 917 A2 | 8/1993 |
| EP | 0 855 643 A1 | 7/1998 |
| EP | 0 992 888 | 12/2000 |
| EP | 0 992 889 | 12/2000 |
| JP | 01037124 A * | 2/1989 |
| WO | 96/11443 | 4/1996 |

OTHER PUBLICATIONS

Moore, M. "Z80 Family Interrupt Structure". Barleywood [online] 1997. [Retrieved on Jul. 7, 2004]. Retrieved from the Internet. <URL: http://www.gaby.de/z80/1653.htm>.*

(Continued)

*Primary Examiner*—Robert Beausoliel
*Assistant Examiner*—Thomas J. Cleary
(74) *Attorney, Agent, or Firm*—Baker Botts L.L.P.

(57) ABSTRACT

A processor processes a variable cycle interrupt disable instruction DISI X is provided. The instruction disables interrupt processing for a variable number of processor cycles corresponding to the value specified by the instruction operand X. The DISI X instruction may be strategically used by programmers to prevent interrupts from being taken during certain intervals within a program.

21 Claims, 4 Drawing Sheets

U.S. PATENT DOCUMENTS

| | | | |
|---|---|---|---|
| 4,615,005 A | 9/1986 | Maejima et al. | 713/601 |
| 4,626,988 A | 12/1986 | George | 364/200 |
| 4,709,324 A | 11/1987 | Kloker | 364/200 |
| 4,730,248 A | 3/1988 | Watanabe et al. | 364/200 |
| 4,742,479 A | 5/1988 | Kloker et al. | 364/746 |
| 4,768,149 A | 8/1988 | Konopik et al. | 364/200 |
| 4,779,191 A | 10/1988 | Greenblatt | 711/2 |
| 4,782,457 A | 11/1988 | Cline | 364/715.04 |
| 4,800,524 A | 1/1989 | Roesgen | 364/900 |
| 4,807,172 A | 2/1989 | Nukiyama | 364/715.08 |
| 4,829,420 A | 5/1989 | Stahle | 364/200 |
| 4,829,460 A | 5/1989 | Ito | 364/715.08 |
| 4,839,846 A | 6/1989 | Hirose et al. | 364/748 |
| 4,841,468 A | 6/1989 | Miller et al. | 708/625 |
| 4,872,128 A | 10/1989 | Shimizu | 364/715.08 |
| 4,882,701 A | 11/1989 | Ishii | 364/900 |
| 4,926,371 A | 5/1990 | Vassiliadis et al. | 708/628 |
| 4,941,120 A | 7/1990 | Brown et al. | 364/748 |
| 4,943,940 A | 7/1990 | New | 364/748 |
| 4,945,507 A | 7/1990 | Ishida et al. | 708/530 |
| 4,959,776 A | 9/1990 | Deerfield et al. | 364/200 |
| 4,977,533 A | 12/1990 | Miyabayashi et al. | 364/726 |
| 4,984,213 A | 1/1991 | Abdoo et al. | 365/230.03 |
| 5,007,020 A | 4/1991 | Inskeep | 364/900 |
| 5,012,441 A | 4/1991 | Retter | 364/900 |
| 5,032,986 A | 7/1991 | Pathak et al. | 364/200 |
| 5,034,887 A | 7/1991 | Yasui et al. | 364/200 |
| 5,038,310 A | 8/1991 | Akagiri et al. | 364/715.04 |
| 5,040,178 A | 8/1991 | Lindsay et al. | 371/21.5 |
| 5,056,004 A * | 10/1991 | Ohde et al. | 712/241 |
| 5,099,445 A | 3/1992 | Studor et al. | 364/715.08 |
| 5,101,484 A | 3/1992 | Kohn | 395/375 |
| 5,117,498 A | 5/1992 | Miller et al. | 395/775 |
| 5,121,431 A | 6/1992 | Wiener | 713/174 |
| 5,122,981 A | 6/1992 | Taniguchi | 364/748 |
| 5,155,823 A | 10/1992 | Tsue | 395/400 |
| 5,177,373 A | 1/1993 | Nakamura | 307/265 |
| 5,197,023 A | 3/1993 | Nakayama | 364/748 |
| 5,197,140 A | 3/1993 | Balmer | 395/400 |
| 5,206,940 A | 4/1993 | Murakami et al. | 395/400 |
| 5,212,662 A | 5/1993 | Cocanougher et al. | 364/748 |
| 5,239,654 A | 8/1993 | Ing-Simmons et al. | 395/800 |
| 5,276,634 A | 1/1994 | Suzuki et al. | 364/748 |
| 5,282,153 A | 1/1994 | Bartkowiak et al. | 364/716 |
| 5,327,543 A | 7/1994 | Miura et al. | 395/375 |
| 5,327,566 A | 7/1994 | Forsyth | 395/775 |
| 5,375,080 A | 12/1994 | Davies | 364/736.5 |
| 5,379,240 A | 1/1995 | Byrne | 364/715.08 |
| 5,386,563 A | 1/1995 | Thomas, deceased | 395/650 |
| 5,392,435 A | 2/1995 | Masui et al. | 395/725 |
| 5,418,976 A | 5/1995 | Iida | 395/800 |
| 5,422,805 A | 6/1995 | McIntyre et al. | 708/625 |
| 5,432,943 A | 7/1995 | Mitsuishi | 395/725 |
| 5,448,703 A | 9/1995 | Amini et al. | 395/290 |
| 5,448,706 A | 9/1995 | Fleming et al. | 395/421.07 |
| 5,450,027 A | 9/1995 | Gabara | 326/98 |
| 5,463,749 A | 10/1995 | Wertheizer et al. | 395/437 |
| 5,469,377 A | 11/1995 | Amano | 364/748 |
| 5,471,600 A | 11/1995 | Nakamoto | 395/405 |
| 5,497,340 A | 3/1996 | Uramoto et al. | 364/745 |
| 5,499,380 A | 3/1996 | Iwata et al. | 395/800 |
| 5,504,916 A | 4/1996 | Murakami et al. | 395/800 |
| 5,506,484 A | 4/1996 | Munro et al. | 318/599 |
| 5,517,436 A | 5/1996 | Andreas et al. | 364/736 |
| 5,525,874 A | 6/1996 | Mallarapu et al. | 318/254 |
| 5,548,544 A | 8/1996 | Matheny et al. | 364/745 |
| 5,561,384 A | 10/1996 | Reents et al. | 327/108 |
| 5,561,619 A | 10/1996 | Watanabe et al. | 364/736.5 |
| 5,564,028 A | 10/1996 | Swoboda et al. | 395/375 |
| 5,568,380 A | 10/1996 | Brodnax et al. | 364/184 |
| 5,568,412 A | 10/1996 | Han et al. | 364/748 |
| 5,596,760 A | 1/1997 | Ueda | 395/588 |
| 5,600,813 A | 2/1997 | Nakagawa et al. | 395/421.07 |
| 5,611,061 A | 3/1997 | Yasuda | 395/591 |
| 5,619,711 A | 4/1997 | Anderson | 395/800 |
| 5,623,646 A | 4/1997 | Clarke | 395/560 |
| 5,638,524 A | 6/1997 | Kiuchi et al. | 395/375 |
| 5,642,516 A | 6/1997 | Hedayat et al. | 395/733 |
| 5,649,146 A | 7/1997 | Riou | 395/421.07 |
| 5,651,121 A | 7/1997 | Davies | 395/376 |
| 5,657,484 A | 8/1997 | Scarra | 395/561 |
| 5,659,700 A | 8/1997 | Chen et al. | 395/421.07 |
| 5,682,339 A | 10/1997 | Tam | 364/715.08 |
| 5,689,693 A | 11/1997 | White | 395/565 |
| 5,694,350 A | 12/1997 | Wolrich et al. | 364/788 |
| 5,696,711 A | 12/1997 | Makineni | 364/748.03 |
| 5,701,493 A | 12/1997 | Jaggar | 395/734 |
| 5,706,460 A | 1/1998 | Craig et al. | 395/380 |
| 5,706,466 A | 1/1998 | Dockser | 395/452 |
| 5,715,470 A | 2/1998 | Asano et al. | 395/800 |
| 5,737,570 A | 4/1998 | Koch | 395/872 |
| 5,740,095 A | 4/1998 | Parant | 364/760 |
| 5,740,419 A | 4/1998 | Potter | 395/588 |
| 5,740,451 A * | 4/1998 | Muraki et al. | 710/260 |
| 5,748,516 A | 5/1998 | Goddard et al. | 364/748.03 |
| 5,748,970 A | 5/1998 | Miyaji et al. | 395/733 |
| 5,764,555 A | 6/1998 | McPherson et al. | 364/748.03 |
| 5,765,216 A | 6/1998 | Weng et al. | 711/214 |
| 5,765,218 A | 6/1998 | Ozawa et al. | 711/219 |
| 5,774,711 A | 6/1998 | Henry et al. | 395/591 |
| 5,778,237 A | 7/1998 | Yamamoto et al. | 713/322 |
| 5,778,416 A | 7/1998 | Harrison et al. | 711/5 |
| 5,790,443 A | 8/1998 | Shen et al. | 364/746 |
| 5,808,926 A | 9/1998 | Gorshtein et al. | 364/748.11 |
| 5,812,439 A | 9/1998 | Hansen | 364/748.03 |
| 5,812,868 A | 9/1998 | Moyer et al. | 395/800.23 |
| 5,815,693 A | 9/1998 | McDermott et al. | 713/501 |
| 5,825,730 A | 10/1998 | Nishida et al. | 369/44.32 |
| 5,826,072 A * | 10/1998 | Knapp et al. | 712/226 |
| 5,826,096 A | 10/1998 | Baxter | 345/800.24 |
| 5,828,875 A | 10/1998 | Halvarsson et al. | 395/588 |
| 5,862,065 A | 1/1999 | Muthusamy | 364/736.5 |
| 5,867,726 A | 2/1999 | Ohsuga et al. | 395/800.32 |
| 5,875,342 A * | 2/1999 | Temple | 710/260 |
| 5,880,984 A | 3/1999 | Burchfiel et al. | 364/748.07 |
| 5,892,697 A | 4/1999 | Brakefield | 364/748.02 |
| 5,892,699 A | 4/1999 | Duncan et al. | 364/760.04 |
| 5,894,428 A | 4/1999 | Harada | 364/724.03 |
| 5,900,683 A | 5/1999 | Rinehart et al. | 307/126 |
| 5,909,385 A | 6/1999 | Nishiyama et al. | 364/760.03 |
| 5,917,741 A | 6/1999 | Ng | 364/748.03 |
| 5,918,252 A | 6/1999 | Chen et al. | 711/217 |
| 5,930,159 A | 7/1999 | Wong | 364/745.01 |
| 5,930,503 A | 7/1999 | Drees | 395/651 |
| 5,936,870 A | 8/1999 | Im | 364/745.03 |
| 5,937,199 A * | 8/1999 | Temple | 710/262 |
| 5,938,759 A | 8/1999 | Kamijo | 712/209 |
| 5,941,940 A | 8/1999 | Prasad et al. | 708/523 |
| 5,943,249 A | 8/1999 | Handlogten | 364/748.02 |
| 5,944,816 A | 8/1999 | Dutton et al. | 712/215 |
| 5,951,627 A | 9/1999 | Kiamilev et al. | 708/404 |
| 5,951,679 A | 9/1999 | Anderson et al. | 712/241 |
| 5,973,527 A | 10/1999 | Schweighofer et al. | 327/172 |
| 5,974,549 A | 10/1999 | Golan | 713/200 |
| 5,978,825 A | 11/1999 | Divine et al. | 708/525 |
| 5,983,333 A | 11/1999 | Kolagotia et al. | 711/219 |
| 5,991,787 A | 11/1999 | Abel et al. | 708/400 |
| 5,991,868 A | 11/1999 | Kamiyama et al. | 712/32 |
| 5,996,067 A | 11/1999 | White | 712/224 |
| 6,002,234 A | 12/1999 | Ohm et al. | 318/729 |
| 6,009,454 A | 12/1999 | Dummermuth | 709/108 |

| | | | |
|---|---|---|---|
| 6,014,723 A | 1/2000 | Tremblay et al. | 711/1 |
| 6,018,757 A | 1/2000 | Wong | 708/525 |
| 6,026,489 A | 2/2000 | Wachi et al. | 712/241 |
| 6,044,392 A | 3/2000 | Anderson et al. | 708/551 |
| 6,044,434 A | 3/2000 | Oliver | 711/110 |
| 6,049,858 A | 4/2000 | Kolagotia et al. | 711/217 |
| 6,055,619 A | 4/2000 | North et al. | 713/36 |
| 6,058,409 A | 5/2000 | Kozaki et al. | 708/409 |
| 6,058,410 A | 5/2000 | Sharangpani | 708/551 |
| 6,058,464 A | 5/2000 | Taylor | 711/217 |
| 6,061,711 A | 5/2000 | Song et al. | 709/108 |
| 6,061,780 A | 5/2000 | Shippy et al. | 712/204 |
| 6,061,783 A | 5/2000 | Harriman | 712/224 |
| 6,074,880 A * | 6/2000 | Sutton et al. | 370/395.2 |
| 6,076,154 A | 6/2000 | Van Eijndhoven et al. | 712/24 |
| 6,084,880 A * | 7/2000 | Bailey et al. | 370/395.2 |
| 6,101,521 A | 8/2000 | Kosiec | 708/550 |
| 6,101,599 A | 8/2000 | Wright et al. | 712/228 |
| 6,115,732 A | 9/2000 | Oberman et al. | 708/625 |
| 6,128,728 A | 10/2000 | Dowling | 712/228 |
| 6,134,574 A | 10/2000 | Oberman et al. | 708/551 |
| 6,144,980 A | 11/2000 | Oberman | 708/627 |
| 6,145,049 A | 11/2000 | Wong | 710/267 |
| 6,181,151 B1 * | 1/2001 | Wasson | 324/765 |
| 6,202,163 B1 | 3/2001 | Gabzdyl et al. | 713/324 |
| 6,205,467 B1 | 3/2001 | Lambrecht et al. | 709/108 |
| 6,209,086 B1 | 3/2001 | Chi et al. | 712/244 |
| 6,243,786 B1 | 6/2001 | Huang et al. | 710/262 |
| 6,243,804 B1 | 6/2001 | Cheng | 712/228 |
| 6,260,162 B1 * | 7/2001 | Typaldos et al. | 714/55 |
| 6,282,637 B1 | 8/2001 | Chan et al. | 712/223 |
| 6,292,866 B1 | 9/2001 | Zaiki et al. | 710/264 |
| 6,295,574 B1 | 9/2001 | MacDonald | 710/261 |
| 6,315,200 B1 | 11/2001 | Silverbrook et al. | 235/454 |
| 6,356,970 B1 | 3/2002 | Killian et al. | 710/269 |
| 6,377,619 B1 | 4/2002 | Denk et al. | 375/232 |
| 6,397,318 B1 | 5/2002 | Peh | 711/220 |
| 6,412,081 B1 | 6/2002 | Koscal et al. | 714/34 |
| 6,434,020 B1 | 8/2002 | Lambert et al. | 363/17 |
| 6,487,654 B2 | 11/2002 | Dowling | 712/254 |
| 6,523,108 B1 | 2/2003 | James et al. | 712/224 |
| 6,552,625 B2 | 4/2003 | Bowling | 332/109 |
| 6,564,238 B1 | 5/2003 | Kim et al. | 708/513 |
| 6,633,970 B1 | 10/2003 | Clift et al. | 712/217 |
| 6,643,150 B2 | 11/2003 | Kawakami | 363/41 |
| 6,658,578 B1 | 12/2003 | Laurenti et al. | 713/324 |
| 6,681,280 B1 | 1/2004 | Miyake et al. | 710/261 |
| 6,694,398 B1 | 2/2004 | Zhao et al. | 710/260 |
| 6,724,169 B2 | 4/2004 | Majumdar et al. | 318/811 |
| 6,728,856 B2 | 4/2004 | Grosbach et al. | 711/202 |
| 6,751,742 B1 | 6/2004 | Duhault et al. | 713/323 |
| 6,763,478 B1 | 7/2004 | Bui | 713/600 |
| 2002/0194466 A1 | 12/2002 | Catherwood et al. | 712/241 |
| 2003/0093656 A1 | 5/2003 | Masse et al. | 712/241 |
| 2004/0150439 A1 | 8/2004 | Greenfeld | 327/131 |

OTHER PUBLICATIONS

"Register" in: The Microsoft Computer Dictionary (3rd Edition), 1997, p. 402. Ref. QA 76. 15.M54 1997 c.289.*
PCT Search Report based on PCT/US02/16706, 6 pages.
PCT Search Report based on PCT/US02/16705, 7 pages.
PCT Search Report based on PCT/US02/16921, 4 pages.
SPARC, International, Inc., "The SPARC Architecture Manual", Version 8, pp. 1–303.
Weaver, et al., SPARC International, Inc., "The SPARC Arcitecture Manual", Version 9, pp. xiv, 137, 146–147, 200–204, 221–222, 234–236, 299.
Free On-Line Dictionary of Computing (FOLDOC). htp://wombat.doc.ic.ac.uk/foldoc/Search term: program counter.
Moon B 1 et al.: "A 32–bit RISC Microprocessor with DSP Functionality: Rapid Prototyping" IEICE Transactions on Fundamentals of Electronics, Communications and Computer Sciences, Institute of Electronics Information and Comm. Eng. Tokyo, JP, vol. E84–A No. 5, pp. 1339–1347, XP001060025 ISSN: 0916–8508.
Turley J: "Balancing Conflicting Requirements When Mixing RISC, DSPs" Computer Design, Pennwell Publ. Littleton, Masschusetts, IS, vol. 37, No. 10, pp. 46, 48, 50–53, XP000860706 ISSN:0010–4566.
Levy M: "Microprocessor and DSP Technologies Unite for Embedded Applications" EDN Electrical Design News, Cahners Publishing Co., Newtown Massachusetts, US, No. Europe, pp. 73–74, 76, 78–80, XP000779113 ISSN: 0012–7515.
Intel, Pentium Processor Family Developers's Manual, vol. 3: Architrecture and Programming Manual, pp. 3–1, 3–2, 3–15, 14–1 to 14–30, 18–7, and 25–289 to 25–292.
Intel, Embedded Intel486 Processor Family Developer's Manual, pp. 2–2, 3–17, 3–37, 4–5, 4–6, 10–1 to 10–12, 12–1 to 12–10.

* cited by examiner

VARIABLE CYCLE INTERRUPT DISABLING

FIELD OF THE INVENTION

The present invention relates to systems and methods for processing interrupt and exceptions to instruction flow in processors and, more particularly, to systems and methods for providing variable cycle interrupt disabling.

BACKGROUND OF THE INVENTION

Processors, including microprocessors, digital signal processors and microcontrollers, operate by running software programs that are embodied in one or more series of instructions stored in a memory. The processors run the software by fetching the instructions from the series of instructions, decoding the instructions and executing them. The instructions themselves control the order in which the processor fetches and executes the instructions. For example, the order for fetching and executing each instruction may be inherent in the order of the instructions within the series. Alternatively, instructions such as branch instructions, conditional branch instructions, subroutine calls and other flow control instructions may cause instructions to be fetched and executed out of the inherent order of the instruction series.

When a processor fetches and executes instructions in the inherent order of the instruction series, the processor may execute the instructions very efficiently without wasting processor cycles to determine, for example, where the next instruction is. When exceptions to normal instruction flow such as interrupts are processed, many processor cycles are taken away from the normal instruction flow to process an interrupt service routing (ISR) corresponding to the interrupt or exception.

In processor applications in which real-time performance of the processor is critical, there is a need to regulate when an interrupt is serviced in order to prevent impairing the real-time performance of the processor. The need may arise at only certain portions of a larger program, for example, when monitoring and processing operations are being performed. At these times, there is a need for a mechanism to prevent the servicing of an interrupt in order to devote processing power to processing the critical program portions.

SUMMARY OF THE INVENTION

According to the present invention, a processor for processing a variable cycle interrupt disable instruction DISI X is provided. The instruction disables interrupt processing for a variable number of processor cycles corresponding to the value specified by the instruction operand X. The DISI X instruction may be strategically used by programmers to prevent interrupts from being taken during certain intervals within a program.

According to one embodiment of the invention, a method of processing an interrupt disable instruction includes fetching and executing an interrupt disable instruction that includes an operand specifying a number of cycles for disabling interrupt processing. The instruction operand may be the number or a pointer to the number. The method may further include changing the number based on processor cycles until the number reaches a predetermined value. The number may be changed by incrementing or decrementing with passing processor cycles. The method may include generating an interrupt disable signal during the changing of the number and generating an interrupt enable signal when the number reaches a predetermined value.

According to another embodiment of the invention, a processor includes an interrupt disable instruction processing feature. It includes a program memory, a register and an instruction fetch/decode unit. The program memory stores instructions, including an interrupt disable instruction DISI X, having an operand X specifying a number corresponding to an interrupt disable duration. The register stores the number and an instruction fetch/decode unit fetches and decodes instructions. When an instruction being processed is a DISI X instruction, the instruction fetch/decode unit decodes the DISI X instruction and disables the interrupt processing capability of the processor based on the number X.

BRIEF DESCRIPTION OF THE FIGURES

The above described features and advantages of the present invention will be more fully appreciated with reference to the detailed description and appended figures in which.

DETAILED DESCRIPTION

According to the present invention, a processor for processing a variable cycle interrupt disable instruction DISI X is provided. The instruction disables interrupt processing for a variable number of processor cycles corresponding to the value specified by the instruction operand X. The DISI X instruction may be strategically used by programmers to prevent interrupts from being taken during certain intervals within a program.

Figure 1:
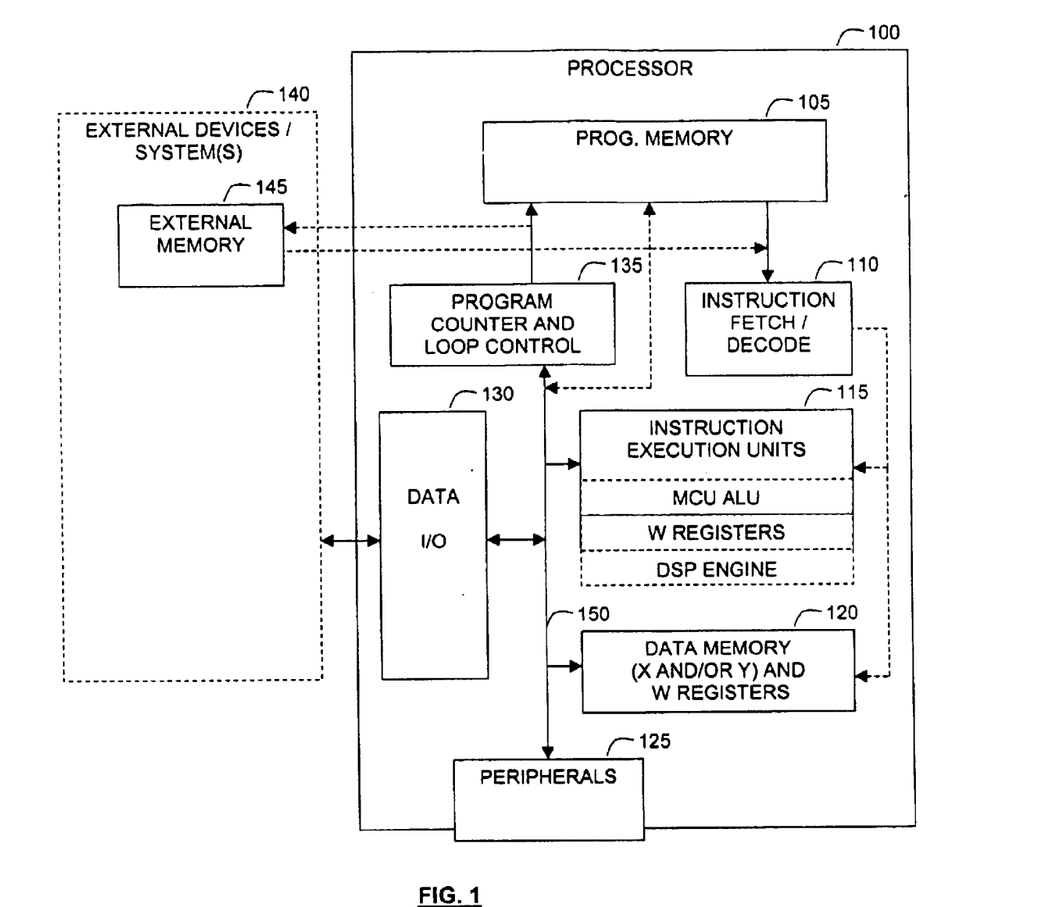
FIG. 1 depicts a functional block diagram of an embodiment of a processor chip within which embodiments of the present invention may find application.
Figure 2:
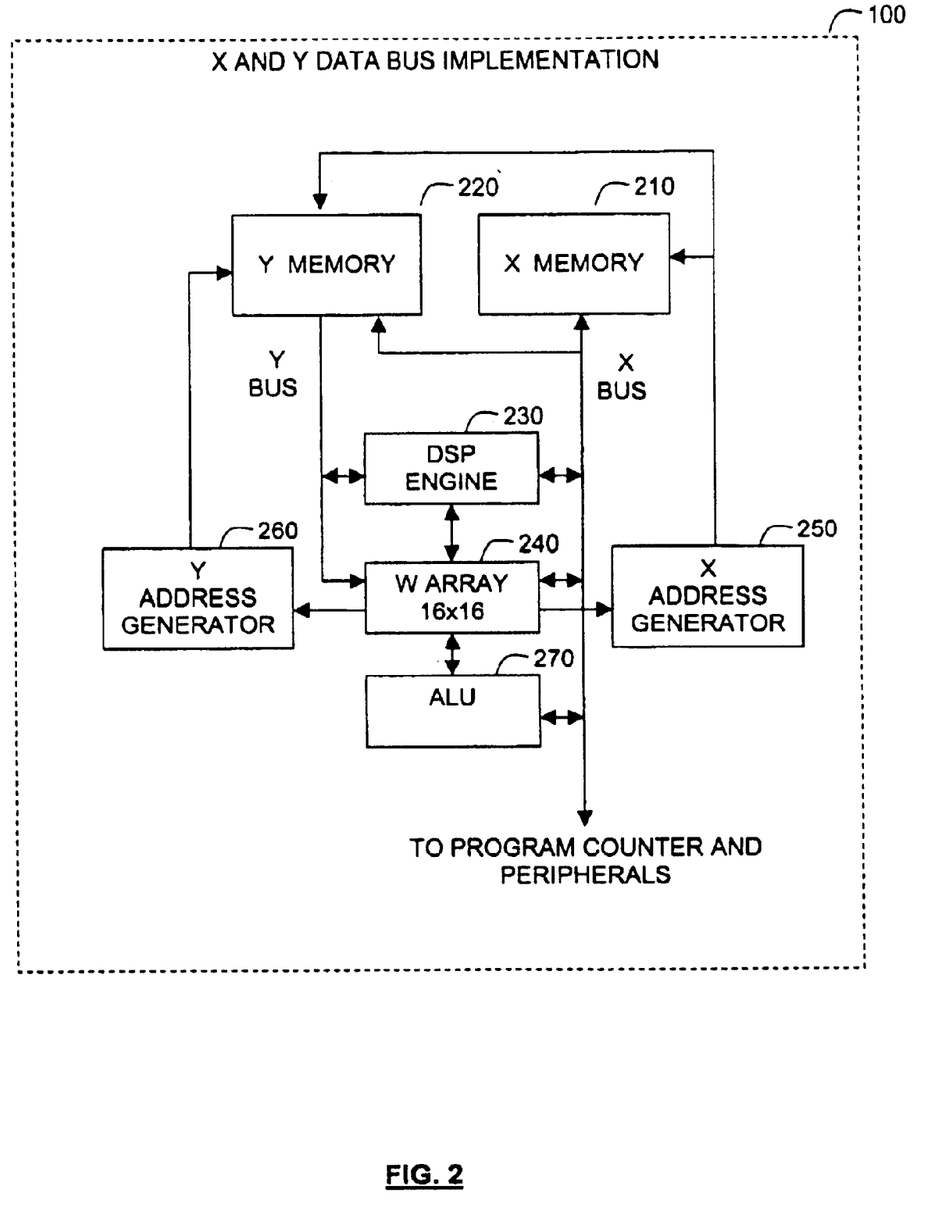
FIG. 2 depicts a functional block diagram of a data busing scheme for use in a processor, which has a microcontroller and a digital signal processing engine, within which embodiments of the present invention may find application.

In order to describe embodiments of DISI X instruction processing, an overview of pertinent processor elements is first presented with reference to FIGS. 1 and 2. The DISI X instruction functionality and processing is then described more particularly with reference to FIGS. 3–4.

Overview of Processor Elements

FIG. 1 depicts a functional block diagram of an embodiment of a processor chip within which the present invention may find application. Referring to FIG. 1, a processor 100 is coupled to external devices/systems 140. The processor 100 may be any type of processor including, for example, a digital signal processor (DSP), a microprocessor, a microcontroller or combinations thereof. The external devices 140 may be any type of systems or devices including input/output devices such as keyboards, displays, speakers, microphones, memory, or other systems which may or may not include processors. Moreover, the processor 100 and the external devices 140 may together comprise a stand alone system.

The processor 100 includes a program memory 105, an instruction fetch/decode unit 110, instruction execution units 115, data memory and registers 120, peripherals 125, data I/O 130, and a program counter and loop control unit 135. The bus 150, which may include one or more common buses, communicates data between the units as shown.

The program memory 105 stores software embodied in program instructions for execution by the processor 100. The program memory 105 may comprise any type of non-volatile memory such as a read only memory (ROM), a programmable read only memory (PROM), an electrically programmable or an electrically programmable and erasable read only memory (EPROM or EEPROM) or flash memory. In addition, the program memory 105 may be supplemented with external nonvolatile memory 145 as shown to increase the complexity of software available to the processor 100. Alternatively, the program memory may be volatile memory which receives program instructions from, for example, an external non-volatile memory 145. When the program memory 105 is nonvolatile memory, the program memory may be programmed at the time of manufacturing the processor 100 or prior to or during implementation of the processor 100 within a system. In the latter scenario, the processor 100 may be programmed through a process called in-line serial programming.

The instruction fetch/decode unit 110 is coupled to the program memory 105, the instruction execution units 115 and the data memory 120. Coupled to the program memory 105 and the bus 150 is the program counter and loop control unit 135. The instruction fetch/decode unit 110 fetches the instructions from the program memory 105 specified by the address value contained in the program counter 135. The instruction fetch/decode unit 110 then decodes the fetched instructions and sends the decoded instructions to the appropriate execution unit 115. The instruction fetch/decode unit 110 may also send operand information including addresses of data to the data memory 120 and to functional elements that access the registers.

The program counter and loop control unit 135 includes a program counter register (not shown) which stores an address of the next instruction to be fetched. During normal instruction processing, the program counter register may be incremented to cause sequential instructions to be fetched. Alternatively, the program counter value may be altered by loading a new value into it via the bus 150. The new value may be derived based on decoding and executing a flow control instruction such as, for example, a branch instruction. In addition, the loop control portion of the program counter and loop control unit 135 may be used to provide repeat instruction processing and repeat loop control as further described below.

The instruction execution units 115 receive the decoded instructions from the instruction fetch/decode unit 110 and thereafter execute the decoded instructions. As part of this process, the execution units may retrieve one or two operands via the bus 150 and store the result into a register or memory location within the data memory 120. The execution units may include an arithmetic logic unit (ALU) such as those typically found in a microcontroller. The execution units may also include a digital signal processing engine, a floating point processor, an integer processor or any other convenient execution unit. A preferred embodiment of the execution units and their interaction with the bus 150, which may include one or more buses, is presented in more detail below with reference to FIG. 2.

The data memory and registers 120 are volatile memory and are used to store data used and generated by the execution units. The data memory 120 and program memory 105 are preferably separate memories for storing data and program instructions respectively. This format is a known generally as a Harvard architecture. It is noted, however, that according to the present invention, the architecture may be a Von-Neuman architecture or a modified Harvard architecture which permits the use of some program space for data space. A dotted line is shown, for example, connecting the program memory 105 to the bus 150. This path may include logic for aligning data reads from program space such as, for example, during table reads from program space to data memory 120.

Referring again to FIG. 1, a plurality of peripherals 125 on the processor may be coupled to the bus 125. The peripherals may include, for example, analog to digital converters, timers, bus interfaces and protocols such as, for example, the controller area network (CAN) protocol or the Universal Serial Bus (USB) protocol and other peripherals. The peripherals exchange data over the bus 150 with the other units.

The data I/O unit 130 may include transceivers and other logic for interfacing with the external devices/systems 140. The data I/O unit 130 may further include functionality to permit in circuit serial programming of the Program memory through the data I/O unit 130.

FIG. 2 depicts a functional block diagram of a data busing scheme for use in a processor 100, such as that shown in FIG. 1, which has an integrated microcontroller arithmetic logic unit (ALU) 270 and a digital signal processing (DSP) engine 230. This configuration may be used to integrate DSP functionality to an existing microcontroller core. Referring to FIG. 2, the data memory 120 of FIG. 1 is implemented as two separate memories: an X-memory 210 and a Y-memory 220, each being respectively addressable by an X-address generator 250 and a Y-address generator 260. The X-address generator may also permit addressing the Y-memory space thus making the data space appear like a single contiguous memory space when addressed from the X address generator. The bus 150 may be implemented as two buses, one for each of the X and Y memory, to permit simultaneous fetching of data from the X and Y memories.

The W registers 240 are general purpose address and/or data registers. The DSP engine 230 is coupled to both the X and Y memory buses and to the W registers 240. The DSP engine 230 may simultaneously fetch data from each the X and Y memory, execute instructions which operate on the simultaneously fetched data and write the result to an accumulator (not shown) and write a prior result to X or Y memory or to the W registers 240 within a single processor cycle.

In one embodiment, the ALU 270 may be coupled only to the X memory bus and may only fetch data from the X bus. However, the X and Y memories 210 and 220 may be addressed as a single memory space by the X address generator in order to make the data memory segregation transparent to the ALU 270. The memory locations within the X and Y memories may be addressed by values stored in the W registers 240.

Any processor clocking scheme may be implemented for fetching and executing instructions. A specific example follows, however, to illustrate an embodiment of the present invention. Each instruction cycle is comprised of four Q clock cycles Q1–Q4. The four phase Q cycles provide timing signals to coordinate the decode, read, process data and write data portions of each instruction cycle.

According to one embodiment of the processor 100, the processor 100 concurrently performs two operations—it fetches the next instruction and executes the present instruction. Accordingly, the two processes occur simultaneously.

The following sequence of events may comprise, for example, the fetch instruction cycle:

| | |
|---|---|
| Q1: | Fetch Instruction |
| Q2: | Fetch Instruction |
| Q3: | Fetch Instruction |
| Q4: | Latch Instruction into prefetch register, Increment PC |

The following sequence of events may comprise, for example, the execute instruction cycle for a single operand instruction:

| | |
|---|---|
| Q1: | latch instruction into IR, decode and determine addresses of operand data |
| Q2: | fetch operand |
| Q3: | execute function specified by instruction and calculate destination address for data |
| Q4: | write result to destination |

The following sequence of events may comprise, for example, the execute instruction cycle for a dual operand instruction using a data pre-fetch mechanism. These instructions pre-fetch the dual operands simultaneously from the X and Y data memories and store them into registers specified in the instruction. They simultaneously allow instruction execution on the operands fetched during the previous cycle.

| | |
|---|---|
| Q1: | latch instruction into IR, decode and determine addresses of operand data |
| Q2: | pre-fetch operands into specified registers, execute operation in instruction |
| Q3: | execute operation in instruction, calculate destination address for data |
| Q4: | complete execution, write result to destination |

Variable Cycle Interrupt Disable Instruction and Processing

Figure 3:
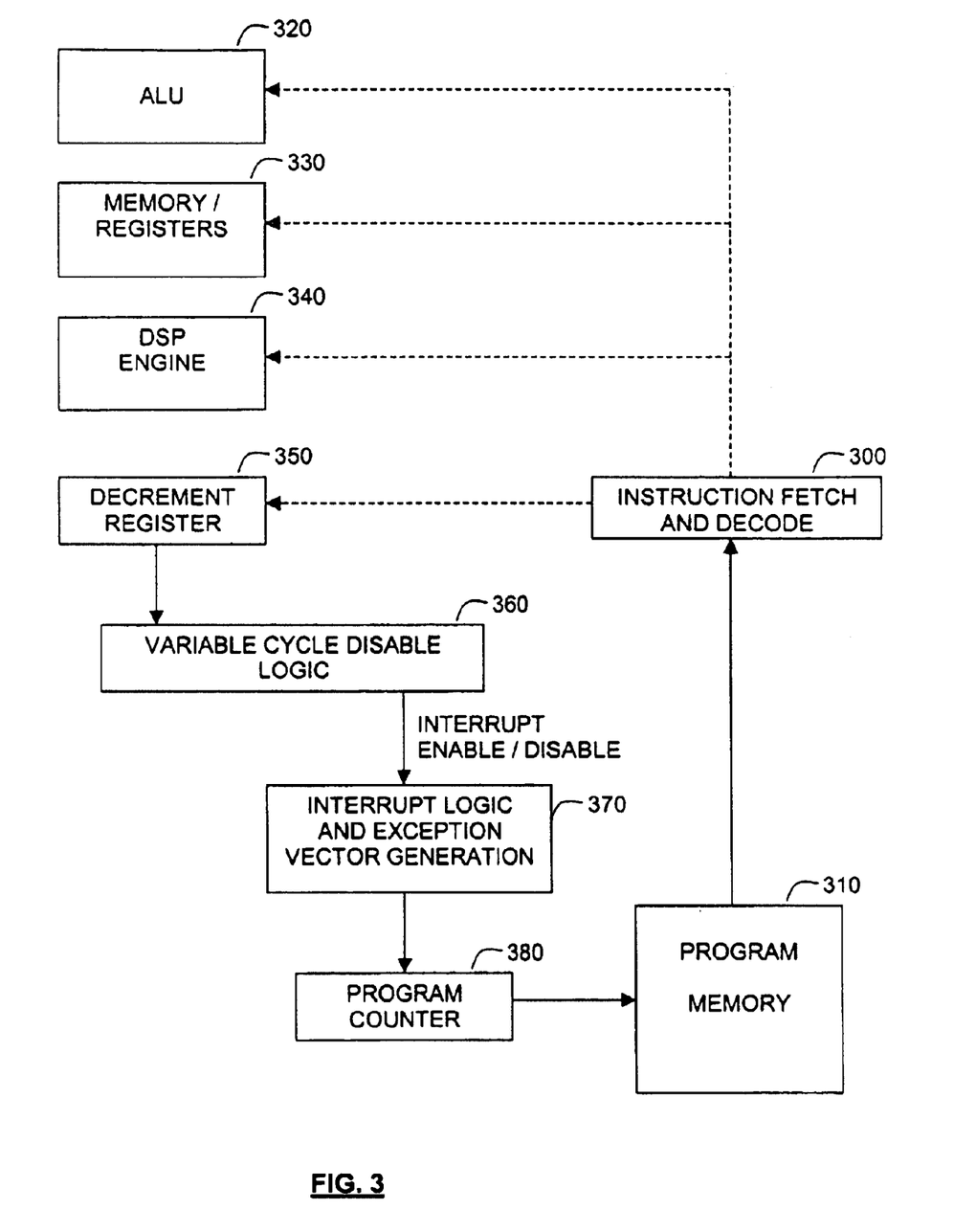
FIG. 3 depicts a functional block diagram of a configuration for processing a variable cycle interrupt disable instruction according to an embodiment of the present invention.

FIG. 3 depicts a functional block diagram of a configuration for processing a variable cycle interrupt disable instruction DISI X according to an embodiment of the present invention.

Referring to FIG. 3, an instruction fetch and decode unit 300 is coupled to a program memory 310. The program memory stores one or more programs with program instructions for execution. The programs may comprise different sections and subroutines, some of which have more stringent performance requirements than others. For example, there may be some subroutines or program sections that perform monitoring and processing functions, such as analog to digital signal conversion or other signal processing where the real-time performance of the processor must be very high. Other, subroutines or program sections may also have high real time performance requirements for other reasons. Programmers may also desire that certain program sections, including interrupt service routines (ISRs), not be subjected to interruption during execution either because errors are likely or for other reasons.

To prevent interruption of a program, program section or portions thereof for a finite interval, a programmer may insert a DISI X instruction. The DISI X instruction causes the processor not to take an interrupt for a certain number of processor cycles defined by or corresponding to the operand X. The DISI X instruction may be placed anywhere in a program.

The instruction fetch and decode unit 300 decodes instructions, including the DISI X instruction, and dispatches the instructions and operands to the ALU 320, memory and registers 330 and the DSP engine 340.

When a DISI X instruction is received, the instruction fetch and decode unit 300 sends the operand X to a decrement register 350. The decrement register 350 may be associated with the interrupt logic 370. The decrement register receives the value of the operand X and is decremented automatically with each passing processor cycle. In one embodiment of the invention, the decrement register decrements the value in the register until it reaches a value of zero at which point the decrementing stops.

Variable cycle disable logic 360 is coupled to the decrement register 350 and to an interrupt logic and exception vector generation unit 370. The variable cycle disable logic receives the value in the decrement register. When the value is non-zero, the variable cycle disable logic generates an interrupt disable signal and transmits the signal to the logic 370. When the value is zero, the variable cycle disable logic 360 generates an interrupt enable signal and transmits the signal to the logic 370.

The interrupt logic and exception vector generation logic 370 receives interrupt request signals from various components of the processor and determines whether and when and to service the interrupt requests based on the priority of the request. When the interrupt logic and exception vector generation logic 370 receives an interrupt disable signal from the variable cycle disable logic, it ceases to generate interrupts but the interrupts continue to be recognized and latched for later invocation.

A program counter 380 is coupled to the interrupt logic and exception vector generation unit 370. The program counter provides addresses to the program memory 310 which determine the next instruction fetched by the instruction fetch and decode unit 300. In the absence of an interrupt, the program counter 300 is incremented (unless a program instruction calls for a jump to a non-sequential instruction). When an interrupt is generated, the value in the program counter 380 is replaced with the address of instructions in the ISR corresponding to the interrupt generated.

When a DISI X instruction is processed, the value X is loaded into a decrement register, which is decremented in successive processor cycles until it reaches a zero value. While the value in the decrement register is not zero, the variable cycle disable logic generates an interrupt disable signal that disables the servicing of interrupts. Accordingly, many instructions in an instruction series after a DISI X instruction may be executed without interruption.

According to one embodiment of the invention, the decrement register is memory mapped. Accordingly, it may be read from and written to by other instructions. This feature may be used to enable interrupts again prior to the natural completion of a variable cycle interrupt disable. As an example, a variable cycle interrupt disable may be used during a subroutine. During or upon completion of the subroutine, an instruction may cause the decrement register to be written with a zero value to end the variable cycle interrupt on the next processor cycle. Alternatively, the subroutine may, upon completion or upon the occurrence of another event, cause the decrement register to be written with a new value. The new value may be zero to terminate the interrupt disable or another value to perpetuate the variable cycle interrupt disable. The decrement register may also be read as any other memory mapped register.

Figure 4:
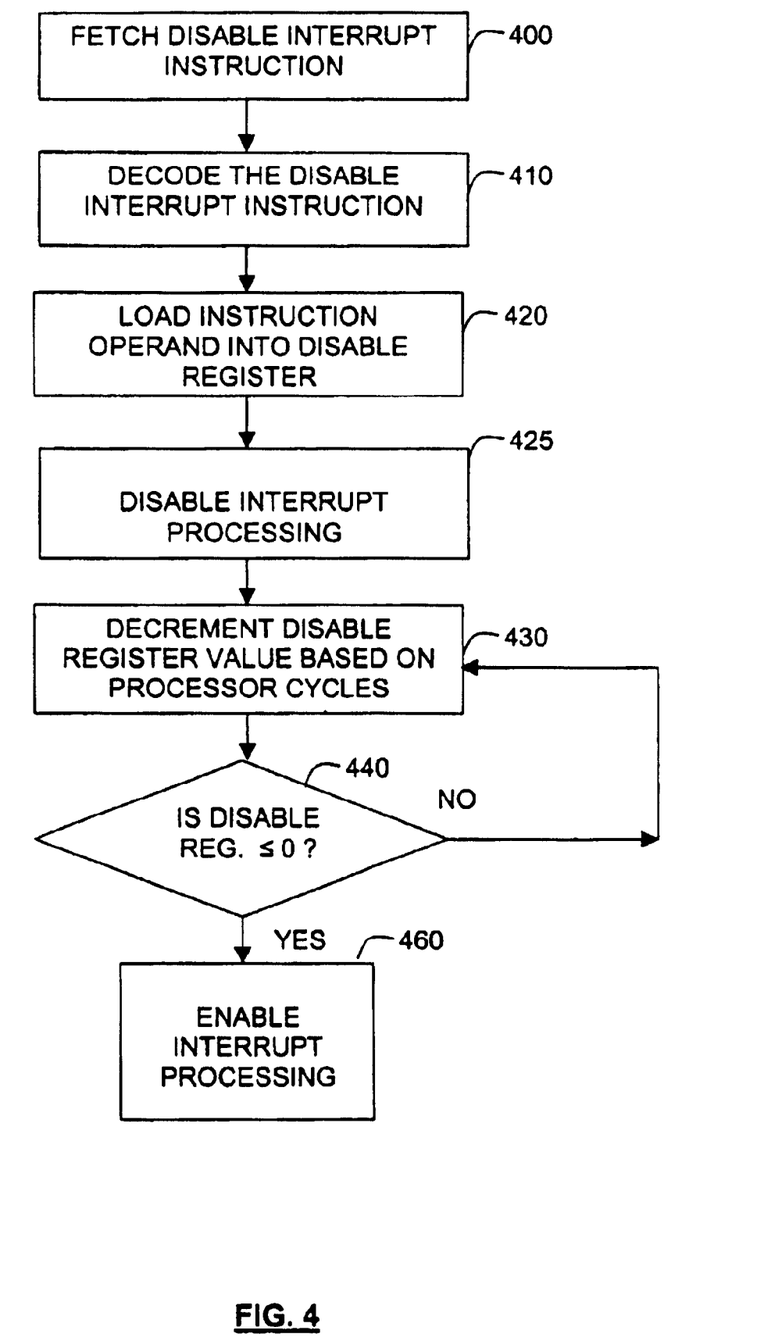
FIG. 4 depicts a method of processing a variable cycle disable instruction according to an embodiment of the present invention.

FIG. 4 depicts a method of processing a variable cycle disable instruction according to an embodiment of the present invention. Referring to FIG. 4, in step 400 a variable cycle interrupt disable instruction DISI X is fetched form program memory. In step 410, the DISI X instruction is decoded. Then in step 420, the X operand of the DISI X instruction is loaded into a decrement register 350. In one embodiment, the value X is an immediate operand of the DISI X instruction and this value is stored directly into the decrement register 350. In other embodiments, X may be a pointer to a memory location or may identify a register which stores the value.

In step 425, the DISI X instruction disables interrupt processing. Then in step 430, the decrement register 350 decrements the value stored in it based on processor cycles. The decrement register may be set to decrement by one, two or any other value with each passing processor cycle. Moreover, the decrement register may decrement with each Q cycle or other signal on the processor. The decrement register may automatically stop decrementing when it reaches zero. Alternatively, a signal may be sent to the decrement register when the value reaches zero to stop the decrement register from decrementing.

In step 440, the processor determines whether the decrement register 350 has reached a predetermined value such as zero. If yes, then step 460 begins.

If not then step 430 begins again and the register value is decremented again. Steps 430 and 440 continue until in step 440 it is determined that the value in the decrement register has reached zero. When this occurs, step 460 begins and the processor enables interrupt processing again.

While specific embodiments of the present invention have been illustrated and described, it will be understood by those having ordinary skill in the art that changes may be made to those embodiments without departing from the spirit and scope of the invention. For example, it will be understood that instead of a decrementing register 350, an incrementing register may be used. Alternatively, the value may be stored in a register that does not increment or decrement. Instead there may be a separate incrementing or decrementing register that produces values that are compared to the X operand of the DISI X instruction. In still other implementations, values other than zero may be chosen as a predetermined value to which to compare the incremented or decremented X value. All of these variations and others are within the scope of the invention.

What is claimed is:

1. A method of processing an interrupt disable instruction included in a program instruction sequence, comprising:

fetching an interrupt disable instruction from the sequence including an operand specifying a number of cycles for disabling interrupt processing; and executing the instruction.

2. The method according to claim 1 wherein the instruction operand is the number.

3. The method according to claim 1 wherein the instruction operand is a pointer to the number.

4. The method according to claim 3, wherein the pointer is stored in a register.

5. The method according to claim 1, wherein the operand identifies a register that stores the number.

6. The method according to claim 1, further comprising loading the number into a register.

7. The method according to claim 6, further comprising changing the number stored in the register based on processor cycles until the number reaches a predetermined value.

8. The method according to claim 7, wherein the changing is decrementing the number stored in the register.

9. The method according to claim 7, wherein the changing is incrementing the number stored in the register.

10. The method according to claim 7, wherein the predetermined value is zero.

11. The method according to claim 7, further comprising generating an interrupt disable signal during the changing of the number.

12. The method according to claim 11, further comprising generating an interrupt enable signal when the number reaches a predetermined value.

13. The method according to claim 7, further comprising writing the register with a value based on a write instruction.

14. A processor including an interrupt disable instruction processing feature, comprising:

a program memory for storing instructions including an interrupt disable instruction having an operand specifying a number corresponding to an interrupt disable duration;

a register for storing the number;

an instruction fetch/decode unit for fetching and decoding instructions, the instruction fetch/decode unit decoding the interrupt disable instruction and disabling the interrupt processing capability of the processor based on the number.

15. The processor according to claim 14, wherein the register changes the number based on processor cycles.

16. The processor according to claim 15, wherein the register changes the number by incrementing it.

17. The processor according to claim 15, wherein the register changes the number by decrementing it.

18. The processor according to claim 15, wherein the disabling the interrupt processing capability ends when the number reaches zero.

19. The processor according to claim 15, further comprising:

interrupt disable logic, coupled to the register, the interrupt disable logic generating an interrupt disable signal during the changing of the number.

20. The processor according to claim 15, wherein the interrupt disable logic generates an interrupt disable until the number reaches a predetermined value.

21. The processor according to claim 15, wherein a write instruction updates the register.

* * * * *